United States Patent
Schwerdtner

(10) Patent No.: US 7,450,188 B2
(45) Date of Patent: Nov. 11, 2008

(54) MULTI-USER AUTOSTEREOSCOPIC DISPLAY WITH POSITION TRACKING

(75) Inventor: Armin Schwerdtner, Dresden (DE)

(73) Assignee: SeeReal Technologies GmbH, Dresden (DE)

( * ) Notice: Subject to any disclaimer, the term of this patent is extended or adjusted under 35 U.S.C. 154(b) by 199 days.

(21) Appl. No.: 10/596,487

(22) PCT Filed: Dec. 17, 2004

(86) PCT No.: PCT/DE2004/002805

§ 371 (c)(1),
(2), (4) Date: Jun. 15, 2006

(87) PCT Pub. No.: WO2005/060270

PCT Pub. Date: Jun. 30, 2005

(65) Prior Publication Data

US 2007/0188667 A1    Aug. 16, 2007

(30) Foreign Application Priority Data

Dec. 18, 2003  (DE) ............................... 103 59 403

(51) Int. Cl.
*G02F 1/13*  (2006.01)

(52) U.S. Cl. ................ 349/15; 349/1; 349/95; 355/22; 356/12; 359/376

(58) Field of Classification Search ............ 349/1, 349/15, 95
See application file for complete search history.

(56) References Cited

U.S. PATENT DOCUMENTS

| | | | |
|---|---|---|---|
| 5,132,839 A * | 7/1992 | Travis | 359/462 |
| 5,392,140 A * | 2/1995 | Ezra et al. | 349/15 |
| 5,410,345 A | 4/1995 | Eichenlaub | |
| 5,771,066 A * | 6/1998 | Barnea | 348/59 |
| 6,014,164 A | 1/2000 | Woodgate et al. | |
| 6,137,456 A | 10/2000 | Bhagavatula et al. | |
| 6,859,240 B1 * | 2/2005 | Brown et al. | 349/15 |

(Continued)

FOREIGN PATENT DOCUMENTS

DE      10339076      3/2005

(Continued)

*Primary Examiner*—Frank G Font
*Assistant Examiner*—Hung Lam
(74) *Attorney, Agent, or Firm*—Saul Ewing LLP

(57) ABSTRACT

An autostereoscopic multi-user display comprising a sweet-spot unit which is directionally controlled by a tracking and image control device (160), wherein an illumination matrix (120) is provided with separately activatable illuminating elements (11 . . . 56), in addition to an imaging device used to alternatingly image active illuminating elements, for making expanded sweet spots (SR1/SR2) visible to various eye positions (EL1/ER1, EL2/ER2) of viewers observing alternating images or a stereoscopic image sequence on a transmissive image matrix (140) with the aid of directed beams (B1R . . . B5L). According to the invention, the imaging device comprises an imaging matrix (110) provided with a plurality of lens elements (111 115) whose focal length is small in order to image the active illuminating elements in an enlarged manner onto the sweet spots (SR1/SR2), and a field lens (171), which follows the imaging matrix (110), in order to keep the distances of the activated illuminating elements between adjacent beams (B1, B2, B4, B5) as constant as possible and in order to assist selection of the directions (D1 . . . D5) with the illumination matrix (120) for the beams.

15 Claims, 7 Drawing Sheets

U.S. PATENT DOCUMENTS

2001/0005284 A1  6/2001  Lee et al.

FOREIGN PATENT DOCUMENTS

| EP | 0570179 | 11/1993 |
| EP | 0881 844 | 12/1998 |
| WO | WO 03/019952 | 3/2003 |
| WO | WO 03/053072 | 6/2003 |
| WO | WO 2005027534 | 3/2005 |

* cited by examiner

FIG. 1 Prior Art DE 103 39 076

MULTI-USER AUTOSTEREOSCOPIC DISPLAY WITH POSITION TRACKING

CROSS REFERENCE TO RELATED APPLICATIONS

This application claims the priority of PCT/DE2004/002805 filed on Dec. 17, 2004 and DE 103 59 403.5 filed on Dec. 18, 2003, the entire contents of which are hereby incorporated in total by reference.

BACKGROUND OF THE INVENTION

1. Field of the Invention

The present invention relates to an autostereoscopic multi-user display having a sweet-spot unit for focussing light to form bundles of rays directed towards the eyes of one or multiple observers, and an image display matrix for alternate modulation of the light of the sweet-spot unit with two-dimensional images with monoscopic or stereoscopic image sequences. In this document, the term "multi-user display" designates a device which can be used by multiple observers for viewing alternate images of image sequences in the form of 3D scenes simultaneously and independently. The present invention takes advantage of temporal interleaving of single images for each of the observers' eyes. When employing this representation method, the resolution is maintained and is not reduced by a factor that represents the number of perspectives, as would be the case with spatial interleaving methods. The resolution is the same as the resolution of the image display matrix.

The auto stereoscopic multi-user display should meet the following conditions: ability to support multiple observers, possibility of free and independent movement of the individual observers in a wide viewing space, and selective access to several image sequences in a 2D and 3D mode. Further desired features are: high image quality, robustness, reliability, little depth, support of practically all common image and video formats, including camera and stereo-camera, and low costs.

Generally, with stereoscopic displays observers can only perceive a stereo image without cross-talking, if their eyes are located at predetermined positions. These positions are also known in the literature as sweet-spots. The present solution aims at focusing a homogeneous, large-area light distribution on extended sweet-spots, so that these sweet-spots can be tracked according to the movements of the observers' eyes and according to the currently represented right or left image using a tracking and image controller.

2. Prior Art

EP 0 881 844 A2 discloses a single-user display with light source tracking. This display works in a sequential mode. Two adjacent segments of a light source pair are provided for the left and right eye of an observer. If a segment for a right eye is turned on a first lenticular projects this segment in a multitude of images onto a diffuser plate. This plate now acts as a secondary light source, which thanks to its diffusion property permeates an image display matrix with the right image through all lenses of the second lenticular, whereby the light is focused on the right eye of an observer.

For the subsequent image, the light source pair is switched to the segment for the left eye and the image matrix is switched to the left image. If the observer moves out of the stereo zone, the second light source pair is turned on, which corresponds with the current zone.

However, it is disadvantageous to use a diffuser plate as it generally prevents multi-user operation, since the diffuser plate with its multitude of secondary light sources is represented in periodical continuation through the second lenticular.

WO 03/019952 A1 discloses a solution for multiple observers with 2D and 3D representation and a tracking system. On an image display matrix, seen from the observer, the display accommodates a controlled directing unit with two lens arrays which include a shutter, in order to focus each pixel of the image separately on one or multiple observers' eyes. Each lens array comprises a separate lens element for each pixel of the image matrix, said lens element focusing the modulated light of the pixel on the shutter. The shutter has a multitude of minute segment openings per pixel, so to open one segment per lens element for each observer, according to his eye position. The segments are projected onto the observers' eyes through a corresponding second lens element of the second lens array disposed behind the shutter. If an observer moves, a position detector transmits the observer's new position, so to only open the shutter segments which correspond with this position, in order to ensure the pixels remain focused on the eyes. During stereoscopic operation using the time-multiplex method, a right and left image are directed to the respective eyes, one after another. If there are multiple observers, multiple segments are activated. During monoscopic operation, all shutter segments may be opened.

A practical realisation of such a multi-user display is rather difficult, because a high-resolution shutter is needed. For example, one embodiment of said document having 100 possible angular positions of observers requires a segment width of 2.5 μm, assuming a typical pixel pitch of 0.25 mm. Assuming that there are 1,600 columns, a shutter with 160,000 segments per line would be required. Further, matching lens elements, shutter openings and pixels of the image matrix requires extreme precision when manufacturing the components and when aligning them during assembly. Already little deviations in pixel or segment dimensions or slight misalignment may lead to functional faults. Further, great resistance of the assembled display to ambient influences, such as temperature fluctuation or vibration, would be required.

Another major disadvantage is represented by the fact that display components cannot be replaced individually. Image display matrix, lens arrays and shutter must always precisely harmonise as regards their geometry, resolution and manufacturing tolerances.

WO 03/053072 A1 discloses a multi-user display with a 3D tracking system and sequential representation of stereoscopic images. The device comprises one behind another, a three-dimensionally addressable backlight, a single large-area, voluminous imaging lens for focusing, and a spatial light modulator as an image display matrix. The backlight allows tracking also as regards the distance between observers and the display. The focused light passes a image display matrix, which alternately modulates a left image and a right image for the respective eyes of the observers.

The disadvantages of this device are a low brightness, because only the light of a locally selectable point light source is available for illuminating the entire image, a large imaging lens and a great depth of the display, which is caused by the three-dimensional backlight. In order to confine aberration of such a large lens outside the optical axis, the focal distance must be sufficiently large, thus making the appliance very deep. Further, a three-dimensional backlight is difficult to manufacture.

A number of patents feature an additional field lens assigned to the projection system, said lens being disposed in various positions in the optical path, and thus having various functions.

Prior patent application WO2005/027534 filed by the applicant, but not published on the day of this application, also describes a multi-user display. That display contains a sweet-spot unit, a device for tracking and image control and a method for tracking the sweet-spots according to eye positions.

FIG. 1 is a top view which illustrates the working principle, but which is not to scale and does not show the full number of optical elements. A multitude of lens elements 111-114 of an imaging means 110 images switchable point illumination elements 11-46 of an illumination matrix 120 onto the observers' eyes $E_R$, $E_L$. Being illuminated by a large-area light source 130, the illumination matrix 120 generates at least one bundle of rays B1-B4 per lens element and observer, said bundles of rays being superimposed to form a two-dimensional sweet-spot $S_R$ at the position of the observers' eyes due to selective activation of illumination elements 11-46 by a tracking and image controller 160, imaging means 110, illumination matrix 120 and backlight source 130 form the controllable sweet-spot unit that generates a directed backlight to render an image of a transmissive LCD image display matrix 140 visible from certain spot positions in the viewing space, said positions being determined by the tracking and image controller 160. In practice, inter al. much more lens elements 111-114 and illumination elements are provided. Sub-pixels of an LCD matrix are preferably used as illumination elements.

On their way to the observer, the bundles of rays B1-B4 permeate large areas of the image display matrix 140, which alternately contains only one image of a stereoscopic image sequence of an image signal PSS. A position detector 150 determines the number of observers and their eye positions $E_R$, $E_L$ in front of the display. The tracking and image controller 160 accordingly activates (in the example shown) the illumination elements 13, 24, 35 and 46, in order to render the current image of the stereoscopic image sequence visible from the eye position $E_R$. As shown in FIG. 1, the illumination elements 13, 24, 35 and 46 are differently positioned in relation to the optical axes of the lens elements. If an observer moves, the tracking and image controller 160 will activate other illumination elements so to track the sweet-spot bundle according to the dislocation of the eyes. For alternate representation of the stereo images the tracking and image controller 160 renders the subsequent image visible for the respective eye of one or all observers by switching the illumination elements in synchronism with each change of the image (in the image matrix). The image is invisible for the other eye for this period of time, as that eye is at the position of a so-called dark spot. If the image sequence for the right and left eye provided by the image display matrix and the synchronised projection onto the respective eyes alternate at a sufficiently high frequency, the eyes can not distinguish the individual images presented to them. Both eyes perceive the image sequence as a stereo representation without cross-talking effects.

The bundles of rays B1-B4 practically propagate in a way that every active illumination element 13, 24, 35 and 46 is projected onto the plane of the eye positions $E_R$ or $E_L$, enlarged to a diameter of at least several millimetres. For the sake of simplicity of the illustration of the working principle, in all figures of this document the sweet-spot is formed by parallel bundles of rays. However, in practice the propagation deviates slightly from this collimation. In any case, the sweet-spot unit is arranged so that each of the bundles of rays B1-B4 covers at least the extension of the sweet-spot area. The sweet-spot area is preferably at least as large as an observer's eye. This allows an observer to view the entire display area of the image display matrix at a homogeneous illumination and without disturbances, even if he moves a few centimetres, without the need to initiate tracking. This also greatly reduces the demands on the tracking and image controller 160 as regards its precision, function and response time.

A major advantage of the sweet-spot unit according to the above-mentioned patent application no. WO2005/027534 is that for manufacture the width of the lens elements 111-114 can be chosen independently of the pixel size in the image display matrix 140, so that each lens element covers a number N of illumination elements 11-16 at least in horizontal direction, in order to generate one sweet-spot each for N different viewing positions of each observer. For the sake of clarity the number N is six (6) in the embodiment shown. In practice, each lens element covers a greater number of illumination elements in horizontal direction. At a given cross-section of the illumination elements 11-46, the number of possible eye positions can be defined by choosing a certain cross-section of the lens elements 111-114. Therefore, it is not necessary to costly comminute the structure of the illumination matrix 130 in order to obtain a great number of possible eye positions, as it is sufficient to easily increase the width of the lens elements 111-114.

The imaging means 110 preferably consist of a lenticular or combination of several lenticulars and the lens elements 111-114 are cylindrical lenses. As a cylindrical lens generally extends over the entire height of the image display matrix 140 in vertical direction, each lens element covers several hundreds of illumination elements of the illumination matrix 120. Because the sweet-spots are only switched alternately between right and left eyes, for the sake of clarity only such elements will be considered in the description below which effect the horizontal orientation of the bundles of rays B1-B4. The illumination matrix switches over column by column. It is not relevant for the description of the present invention how many illumination elements are covered by a cylindrical lens in the vertical direction. According the present invention the tracking and image controller 160 may also track the sweet-spots in vertical direction. Analogously to horizontal tracking, the sweet-spots would be tracked by selecting respective illumination elements in the vertical direction of a two-dimensionally extended projection system.

Preferably, several adjacent illumination elements can be activated simultaneously for each bundle of rays B1-B4 in order to increase image brightness and sweet-spot width.

Another advantage of the present method is that the sweet-spot unit does not have to be modified if the image matrix is replaced.

The Technological Problem

In order to fully view the image display matrix 140, at least one illumination element per line must be activated for each lens element 111-114 and eye position. In addition, the illumination elements whose corresponding bundles of rays B1-B4 are oriented towards respective eye positions $E_R$, $E_L$ in directions D1-D4 must be activated. As shown in FIG. 1, this is achieved in the sweet-spot unit according to patent application DE 103 39 076 by activating the illumination elements corresponding to the lens elements depending on the directions D1-D4 by the tracking and image controller 160.

In the example, an active third illumination element 13 realises the direction D1, whereas an active sixth illumination element 46 realises the direction D4. This has adverse effects on the practically usable resolution, in particular towards the margins of the illumination matrix 120, where the inventory of controllable positions is reduced. This effect considerably confines the viewing angle at which an observer can view the entire image, and thus the geometrical tracking range available for the tracking and image controller. This represents a significant disadvantage, in particular for the function of an autostereoscopic multi-user display, because a large viewing space and thus a wide range for the tracking and image controller are desirable when two or more observers are in front of the display. Moreover, even if the observer is positioned in the centre, illumination elements and lens elements are arranged at a large angle, as can be seen in FIG. 1 with the example of illumination element 46 and lens element 114. Such lenses cause aberrations, which substantially disturb the homogeneity of the projection through the image display matrix 140.

Now, this problem will be shown in more detail with the example of lens elements 111 and 114, which are situated at the margin of the imaging means 110. Whereas it is sensible to activate the illumination elements 11-13 for lens element 111, a bundle of rays B1* would be directed to a less sensible spot position $S_0$ if the illumination element 14 were activated. Since the outermost illumination element 46 corresponding to lens element 114 is already active, lens element 114 is unable to reach spot position $S_0$. In practice, the image display matrix 140 would therefore only be visible without the contribution of the bundle of rays B4 at position $S_0$.

In the described example, an examination of illumination elements 15, 16, 26, 41, 42 and 43 would show similar results. Although this deficiency could be remedied for position $S_0$ by adding an extra illumination element, which would enlarge the imaging means 110, this does not generally solve the problem, because it is not possible to add extra illumination elements corresponding to lens elements 112, 113, which are closer to the centre of the imaging means 110.

Because the distance of the illumination elements is always greater than the distance of the lens elements, large angles occur particularly at the margins of the imaging means 110, leading to significant aberrations and thus disturbing the homogeneous illumination of the image display matrix 140.

SUMMARY OF THE INVENTION

The present invention relates to an autostereoscopic display that can be used by several observers simultaniously, a so-called multi-user display, controlled by a tracking and image controller, said display being characterised by low cost and little labour for the individual components and their alignment, flat design, possibility of replacing optical components having various geometries, and great brightness, and said display preventing the disadvantage of the above-discussed solution, in particular the restrictions to the tracking ability of the sweet-spot unit, and said display minimising aberrations and thus substantially improving the quality and foremost the homogeneity of the viewed images.

This solution is based on an autostereoscopic multi-user display having a sweet-spot unit, which is controlled by the tracking and image controller, and which directs and focuses bundles of rays with a predetermined, large area on several eye positions of observers. The sweet-spot unit acts as a controllable, directed backlight for a transmissive image display matrix. The bundles of rays permeate extensive the image display matrix, where they are sequentially modulated with stereoscopic image sequences. In this process the bundles coincide in front of the respective eyes of each observer that corresponds to the current image of the stereoscopic image sequence, and to form a sweet-spot which renders the entire current image visible. The sweet-spot unit contains a controlled illumination matrix having a multitude of illumination elements which can be activated discretely, and an imaging device for imaging bundles of rays onto the sweet-spots, whereby the tracking and image controller determines the direction of each bundle of rays by activating according illumination elements.

According to this invention, the object is achieved by an an imaging device containing imaging means having a multitude of lens elements arranged in a matrix as well as a field lens which is disposed behind the imaging means, seen in the direction of light propagation, and which covers the entire imaging means. The field lens does not have the classic function of a condensing lens, because this function can be realised by particular selection of illumination elements. The lens elements image the active illumination elements in an almost collimated way and enlarged onto the sweet-spots. The focal distance of the lens elements is correspondingly short.

In contrast, the focal distance of the field lens is much longer than that of the lens elements. The field lens has the function of activating such illumination elements which have almost the same angle to the corresponding lens elements. If possible, the same corresponding illumination elements are thus activated per lens pitch. Like angles to all lens elements ensure a maximum tracking range and minimum aberrations, which is of major importance for homogeneous illumination of the image display matrix.

If an observer moves laterally, other known image distortions beside spherical aberration occur, such as image area curvature and coma, but such distortions being minimised by the imaging of identical active illumination elements below the lens elements of the lenticular. In other words, the field lens effects a sweet-spot being formed by such illumination elements which cause minimum image distortion. At a given image quality, the field lens enlarges the tracking range. Extreme positions of the active illumination elements, such as position 46 in FIG. 1, only occur at extreme lateral observer positions.

This invention has the major advantage that, independently of the position of the lens elements, all active illumination elements have about the same relation to the corresponding lens element, so that the illumination matrix and imaging means must only generate about collimated, parallel bundles of rays directed to the corresponding sweet-spot. Because of the similarity of connection patterns, this makes it possible to use the inventory of illumination elements per lens element more efficiently, thereby increasing the number of positions which can be controlled, thus extending the tracking range of the sweet-spot unit. The inventory of angles which can be used for tracking the sweet-spots is practically the same for all bundles of rays, i.e. it is independent of the location of the bundle of rays in the image display matrix.

If an observer moves away from his viewing plane, the tracking and image controller with position detector can adapt the direction of the bundles of rays to the detected new distance of the eye positions in the space in front of the display. The identical assignment of illumination elements to the corresponding lenses is minimally disturbed. With this invention, a sufficient inventory of illumination elements remains for each lens element, so that the directions of the bundles of rays can be corrected by changing the activated illumination elements as controlled by the tracking and image controller.

In order to image the activated illumination elements onto sweet-spots of finite dimension in the viewing plane, the lens elements must have short focal distances.

Assuming the observer is located in the centre in front of the display and about in the focal distance of the field lens, and if collimated light is used for the sweet-spot, the illumination elements are situated in the plane formed by the front focal distance of the lens elements. If the observer moves laterally, the field curvature caused by the lens element becomes increasingly perceivable, the collimated bundles of rays are transformed into a focused imaging of the illumination elements. If the observer is in a central position, the lens elements are preferably positioned closer to the illumination elements than suggested by their focal distance. If the observer moves laterally, this distance increases until it reaches and even exceeds the focal distance.

By suitably selecting the focal distance of the field lens in correspondence with the focal distance of the lens elements, an optimum space can be defined in which sweet-spots for a high-quality 3D representation can be generated by the sweet-spot unit.

The imaging means contains imaging elements which are arranged to form at least one lenticular or lens array. The imaging elements are constructed to cover a multitude of controllable illumination elements of the illumination matrix at least in horizontal direction. Thus, they also cover a multitude of pixels of the image display matrix in horizontal direction.

The illumination matrix may be either an electronic shutter which provides illumination elements in the form of openings, location and transmission of said openings being discretely controllable, and said shutter being illuminated by a backlight, or consist of actively light-emitting illumination elements arranged in line or matrix structure, said illumination elements being discretely controllable. Examples are organic LED (OLED) panels and projection units based on DLPs, TFTs or other types.

In the present invention, the term field lens is used as a general generic term. Its function in the context of this invention is to reduce optical aberrations and to enlarge the viewing space. Because of the size of this lens, Fresnel lenses are preferably used in such optical systems.

Further, the field lens may also be a holographic optical element being controllable by the tracking and image controller, said holographic optical element having a variable focal distance in order to improve the tracking range.

Thanks to the functional and constructional separation of the individual display components it is possible to reduce the demands on the resolution of the illumination matrix. It is only defined by the number of controllable positions or angles. In particular, this solution provides great independence of the image display matrix. This allows, for example, the image display matrix to be replaced for another image display matrix having a higher resolution, as long as the outer dimensions are the same.

The imaging means may wholly or partly be made of a material the optical properties of which can be controlled, such as a polymer. In order to avoid Moiré effects, a non-polarising, diffusing medium, such as a diffuser foil, is disposed in front the image display matrix, seen in the direction of light propagation.

PREFERRED EMBODIMENTS OF THE INVENTION

Figure 1:
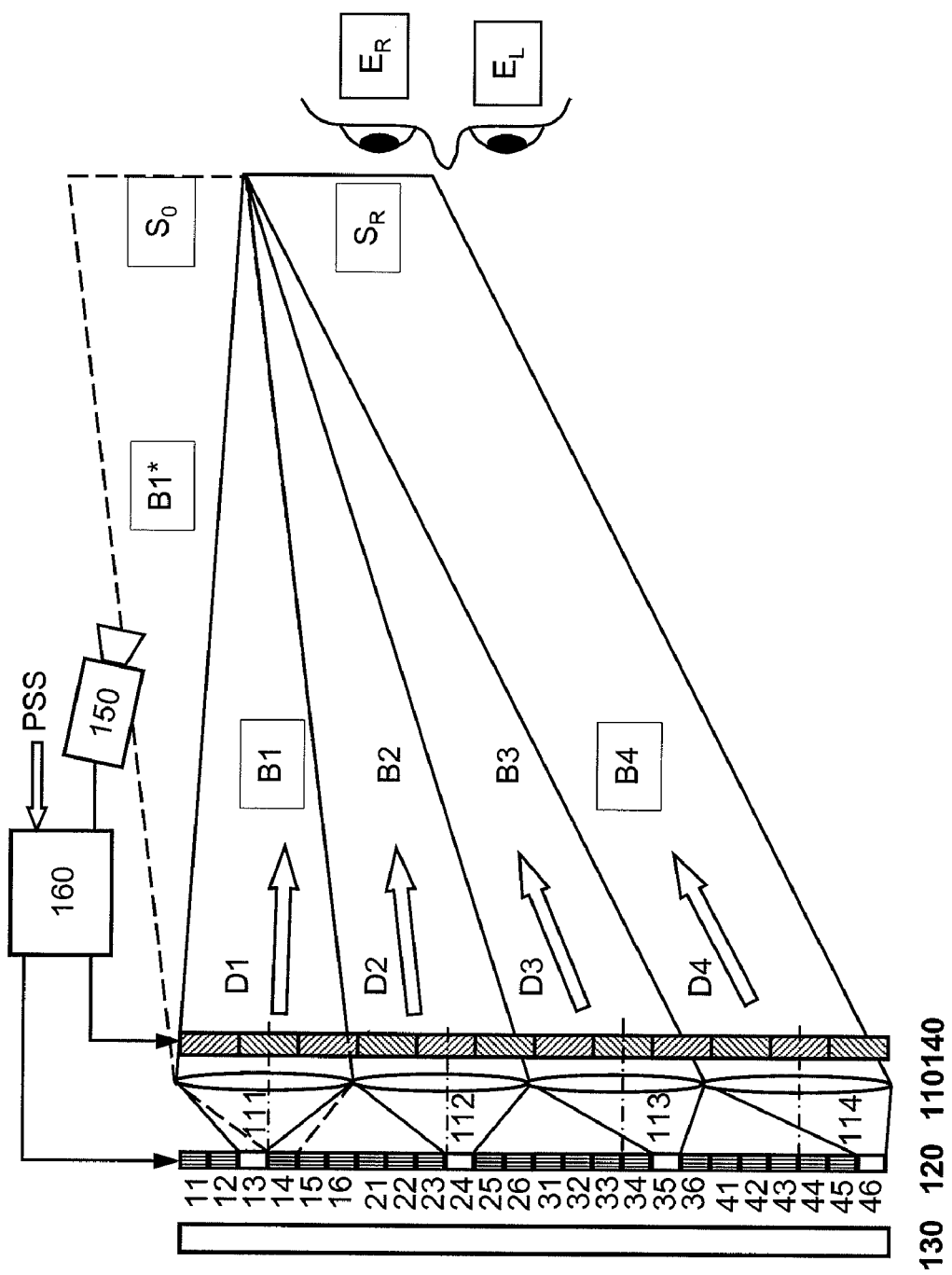
FIG. 1 shows an autostereoscopic multi-user display as described in the prior art patent application WO2005027534.

During the course of this description, like numbers will be used to identify like elements according to the different views that illustrate the invention.

The autostereoscopic multi-user display according to this invention is described with the help of embodiments and illustrated in the accompanying FIGS. 2-7. Identical functional elements of the autostereoscopic multi-user display according to this invention are denoted by same reference numerals in all figures.

Figure 2:
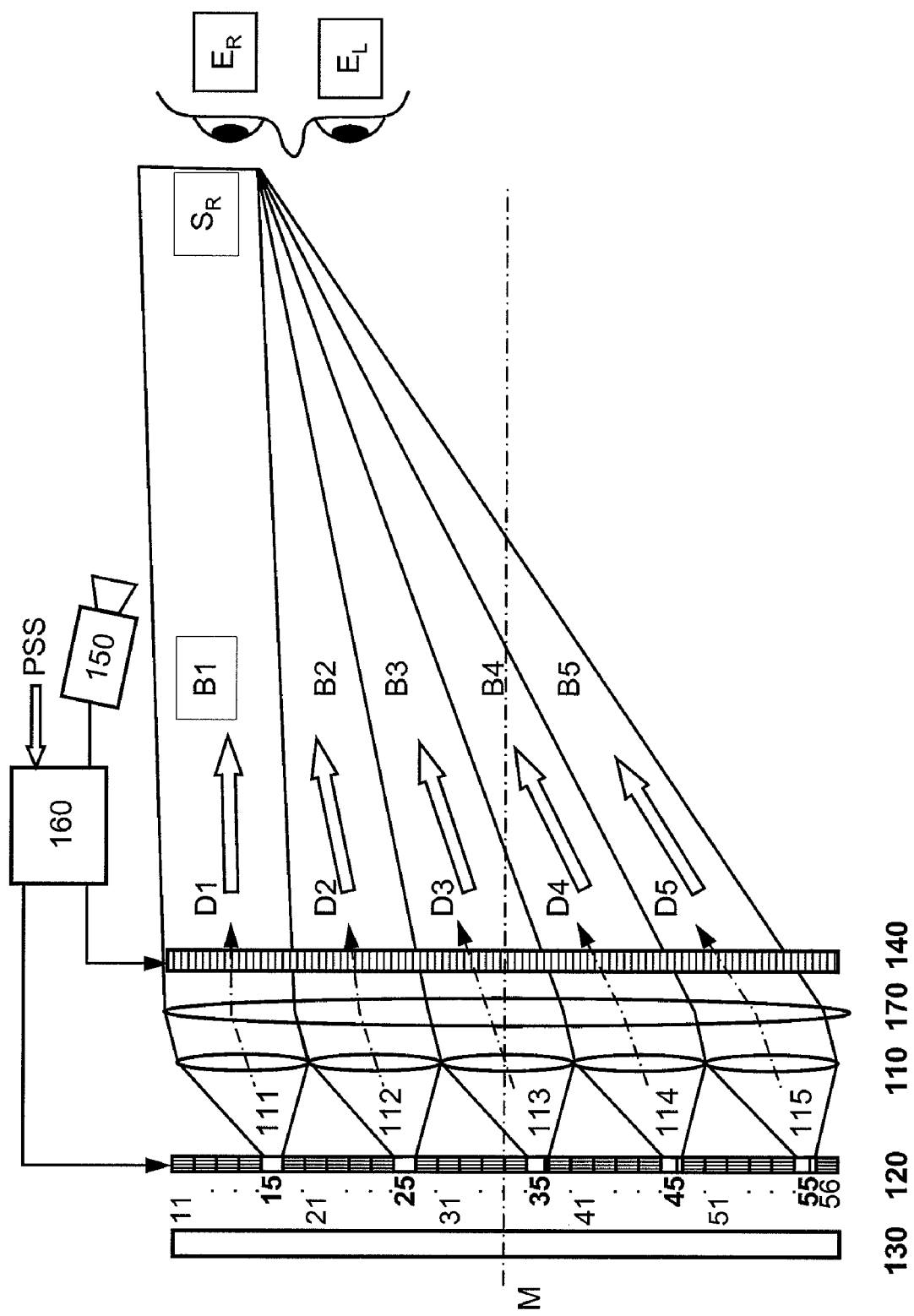
FIG. 2 shows an autostereoscopic multi-user display according to the present invention with a sweet-spot unit for generating geometrically uniform sweet-spots for an eye of an observer, and an imaging means.

FIG. 2 shows, with the example of the right eye $E_R$ of an observer, the arrangement of elements according to the invention, where numeral 110 denotes an imaging means with lens elements 111-115 and numeral 120 denotes an illumination matrix for generating a bundle of rays B1-B5 for each lens element 111-115. In this embodiment, the illumination matrix 120 is a shutter which uses the light of a large-area light source 130. The shutter contains transmissive illumination elements 11-56. It is an LCD or FLCD panel. In this embodiment, the imaging means 110 is a lenticular. The illumination matrix 120 is disposed about in the focal plane of this lenticular, so that bundles of rays B1-B5 are emitted by the imaging means 110 in the form of near-parallel bundles.

All active illumination elements 15, 25, 35, 45 and 55 of the illumination matrix 120 have an identical position in relation to the corresponding lens element. Therefore, the bundles of rays are emitted from the lens elements 111-115 at the same angle and have the same optical and geometrical properties. On the one hand, this regards the geometry of the cross-section and the above-discussed aberrations and directivity distortions. Therefore, the homogeneity of all sweet-spots and thus the quality of image representation by the display are substantially improved. On the other hand, because of the similar position of the active illumination elements in relation to the corresponding lens element, the tracking and image controller 160 can fall back on the same inventory of controllable positions for each bundle of rays B1-B5. Therefore, the geometrical tracking range of the tracking and image controller 160 is substantially widened. Only now it is possible to track the sweet-spots according to the positions of the eyes of multiple observers situated at various distances to the display by tracking the illumination matrix 120 with the help of the tracking and image controller 160.

As shown in FIG. 2, the bundles of rays B1-B5 are emitted from the field lens 170 in different directions D1-D5 and coinside in front of the right eye E R of an observer to form a sweet-spot $S_R$. The bundles of rays B1-B5 are modulated image by image, as shown in FIG. 1.

Figure 3:
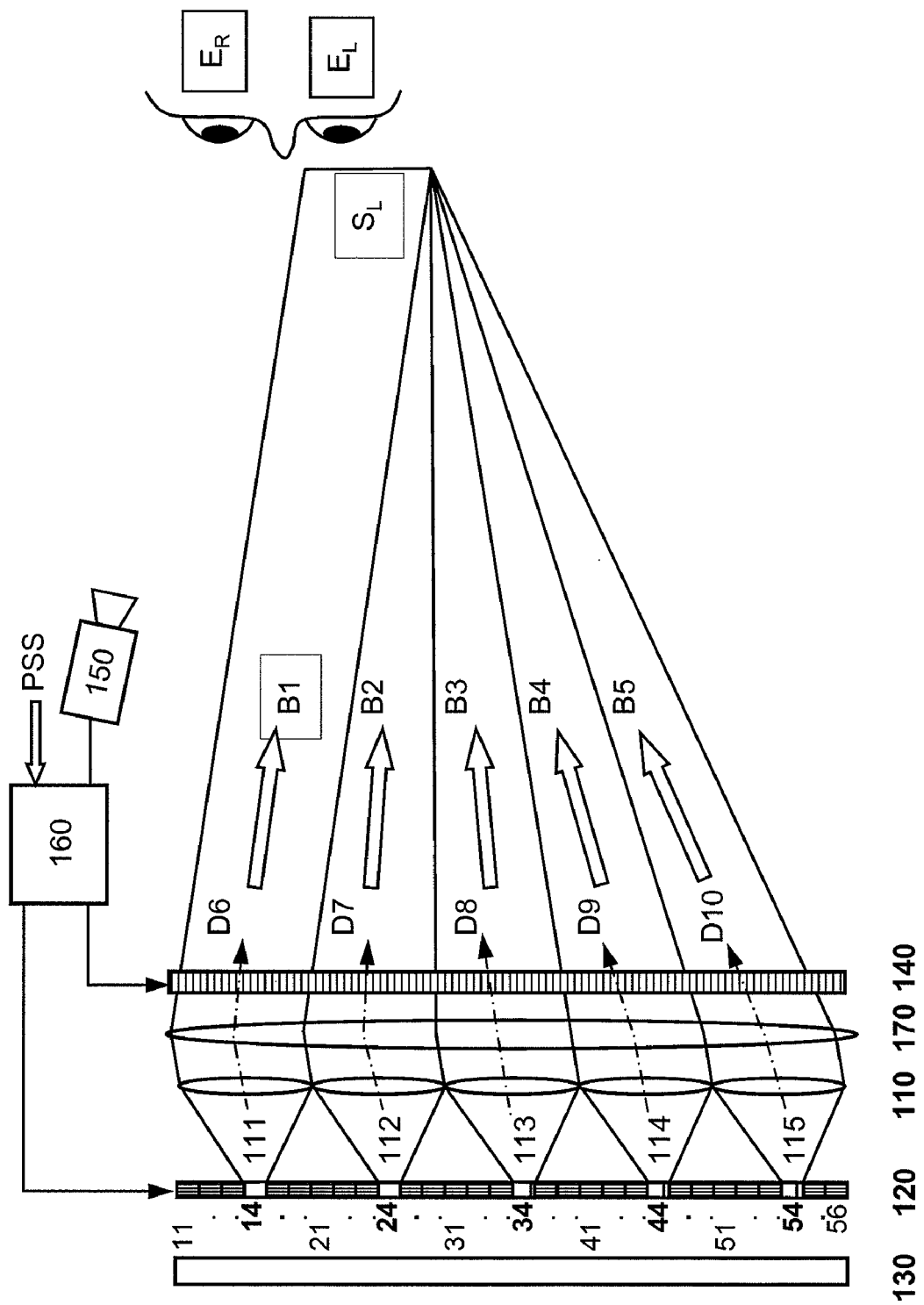
FIG. 3 shows an autostereoscopic multi-user display according to the present invention with a sweet-spot unit for generating sweet-spots for the other eye of the observer.

The left eyes of the observers are subsequently provided with the left stereo image in the same way, as shown in FIG. 3. Now, the illumination elements 14, 24, 34, 44 and 54 are activated. The bundles of rays B1-B5 are emitted from the field lens 170 in different directions D6-D10 and superimposed in front of the left eye $E_L$ of an observer to form a sweet-spot $S_L$.

Figure 4:
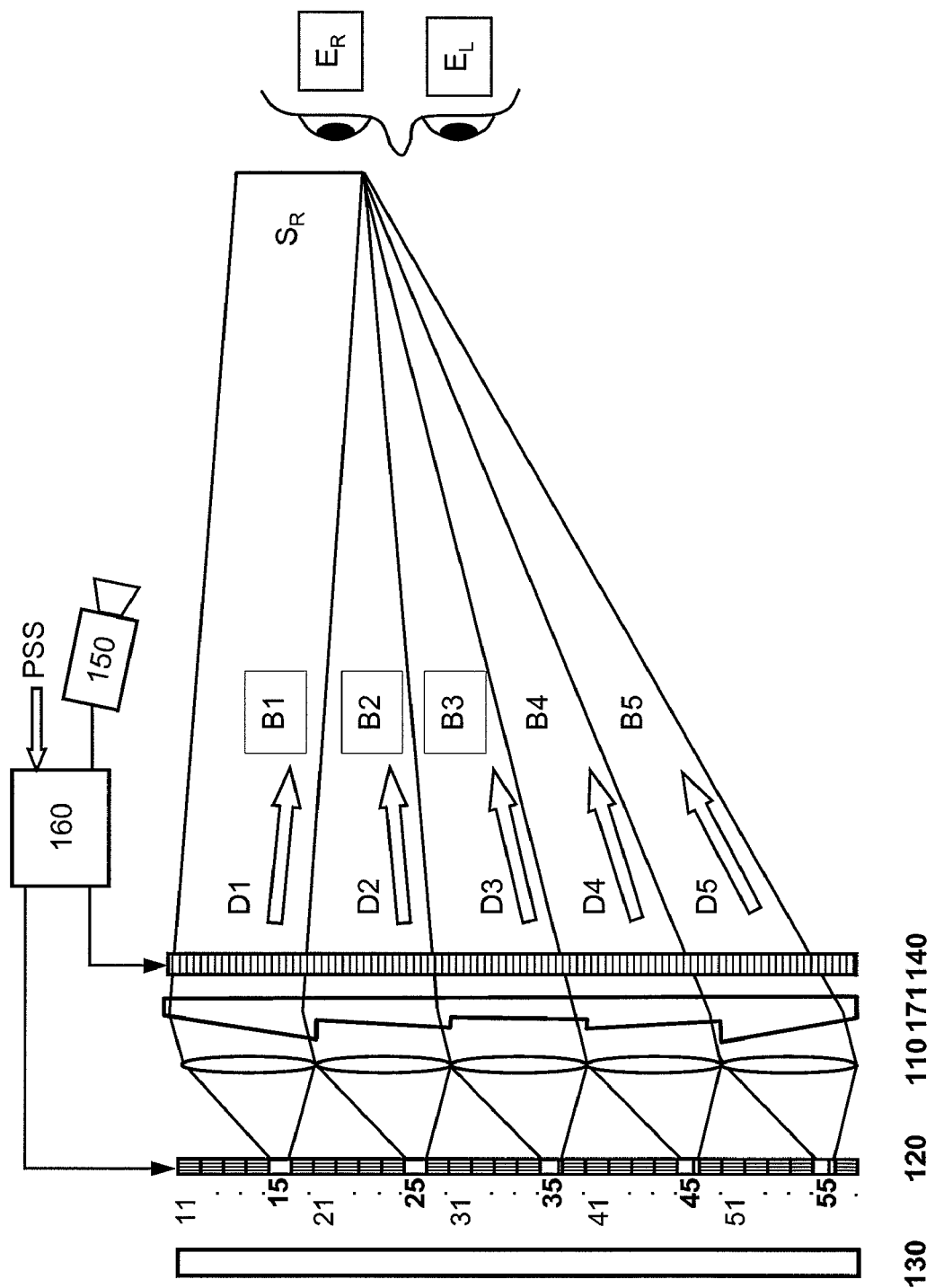
FIG. 4 shows a sweet-spot unit according to the present invention with a Fresnel lens.

As shown in FIG. 4, a Fresnel lens 171, which needs much less space and which is considerably cheaper, can be used preferably instead of a compact field lens 170. The structured side of the Fresnel lens 171 preferably faces the imaging means 110. If the structured side of the Fresnel lens 171 was oriented towards the image display matrix 140, refractive angles would occur which would cause a near-total or total reflection, in particular at the left and right margins of the display. As regards their focal distance and angle of entry of the bundles of rays, the cuts of the field lens can preferably be designed so that the bundles of rays coincide clearly in front of an optimum observer distance, without each bundle of rays itself converging considerably. The beginning of the working range in which the tracking and image controller tracks the bundles of rays can be determined by varying the focal distance of the field lens. This is why the optimum focal distance preferably lies in the range of between a half and a full optimum distance between an observer and the display.

The imaging means 110 of the sweet-spot unit is a lenticular or contains imaging elements otherwise arranged in line or matrix format. The number of positions which can generally be discretely controlled in the viewing space is determined by the ratio of the cross-sectional area of the imaging elements and the number of covered openings of the illumination matrix.

Because of the aberrations, the angular range of a lenticular is relatively small, for example 0.1 rad. In order to suppress aberration and/or to enlarge the viewing angle, it is also possible to use double lenticulars instead of single lenticulars. Least aberrations and thus greatest viewing angles are provided by lenticulars with a vertex aligned with the direction of the light.

A simple lenticular with single lenses exhibits the above-discussed image distortions, such as spherical aberrations and coma. A preferred embodiment aiming at preventing such distortions contains a tandem lenticular, consisting of two parallel and co-linear single lenticulars. The vertices of the imaging elements of both single lenticulars are aligned with the direction of light arranged congruently and have a slightly differing pitch. Another variant of the imaging means employs a double lenticular, with the pitches of the single lenticulars being near-congruent, but with the lenses facing each other.

Figure 5:
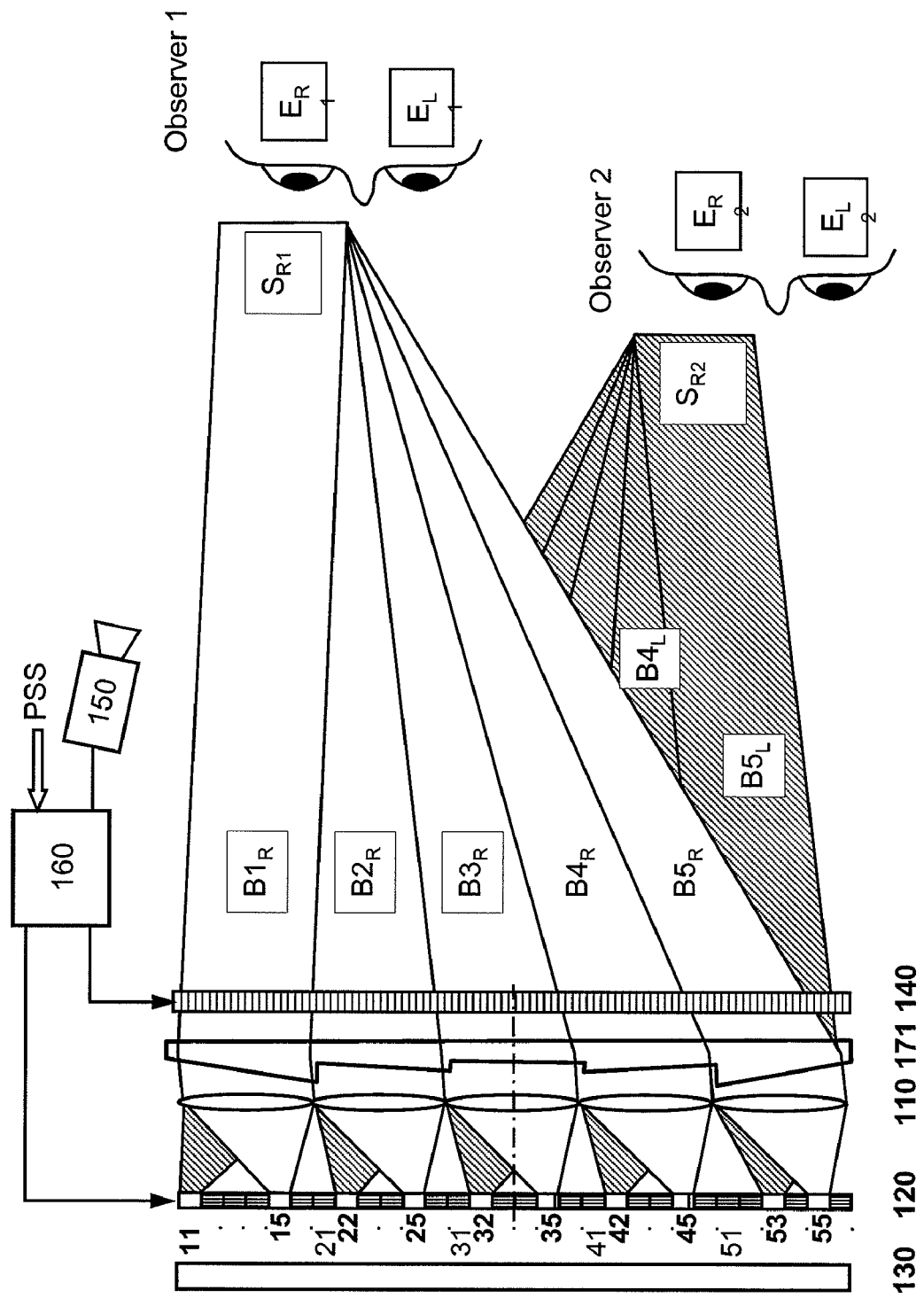
FIG. 5 shows a sweet-spot unit according to the present invention with active illumination elements for generating sweet-spot bundles for several observers.

FIG. 5 shows the arrangement for multiple observers for a stereoscopic representation. At the shown moment, the image display matrix 140 contains the right stereo image, here for two observers. Bundles of rays $B1_R$-$B5_R$ and $B1_L$-$B5_L$, for sweet-spots $S_{R1}$ and $S_{R2}$ for the right eyes $E_{R1}$ and $E_{R2}$, respectively, of the two observers are generated by activating the corresponding illumination elements 15, 25, 35, 45 and 55 of the illumination matrix 120. As the next image of the image sequence, the image display matrix 140 contains the left stereo image and sweet-spots are now directed to the left eyes $E_{L1}$ and $E_{L2}$ of the observers. Two or more observers may also see different monoscopic images. This is achieved by activating the sweet-spots for observer's eyes simultaneously while the image matrix contains the image intended for that observer. Further, the display may be switched to a monoscopic mode for any number of observers by activating the entire illumination matrix. This leads to a uniformly bright illumination of a large area in the viewing space.

Figure 6:
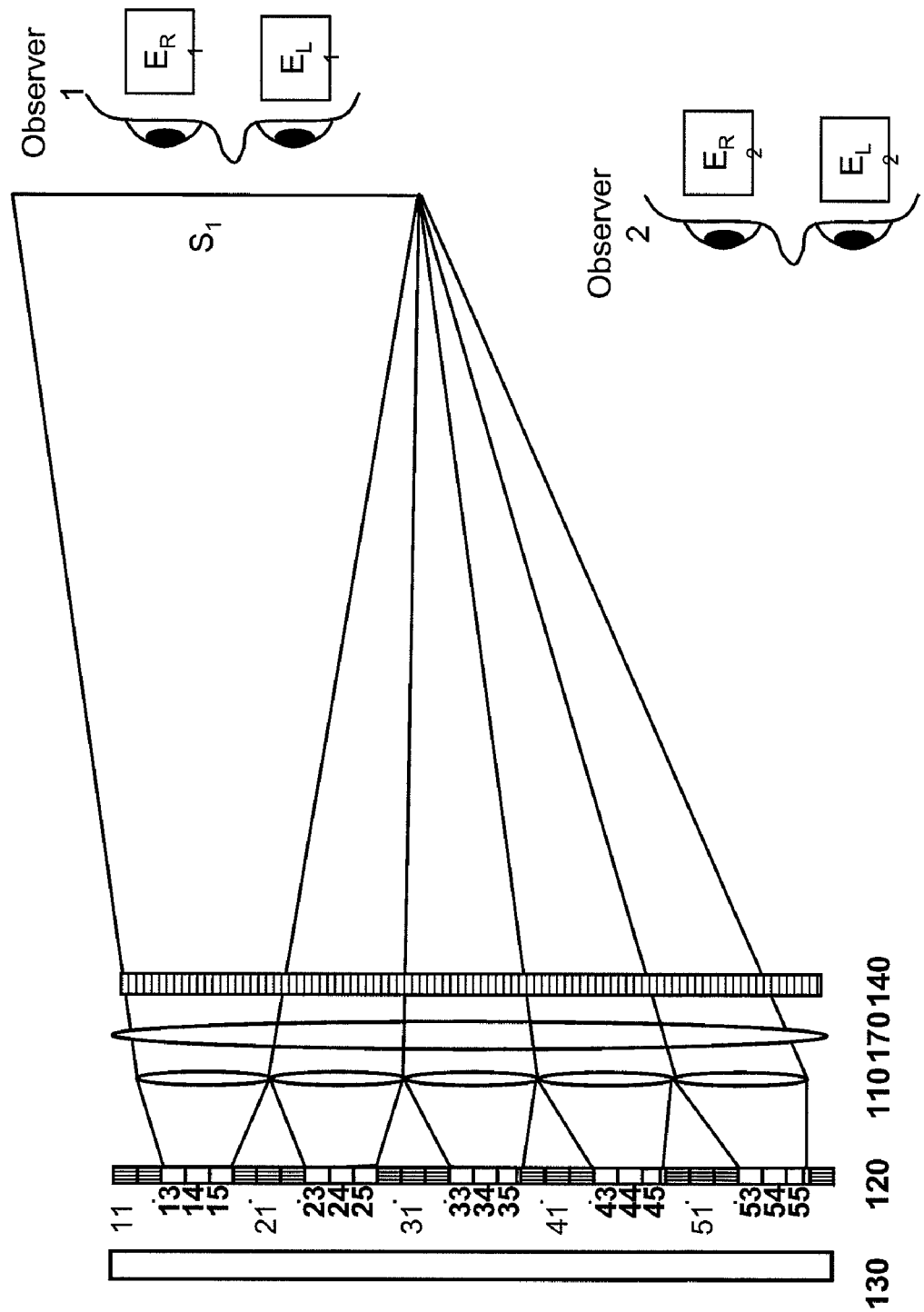
FIG. 6 is a schematic view of the operation of the display in the 2D mode, where a sweet-spot is generated for one observer only.

If image information has to be withholded for one observer, it is sufficient to turn off the corresponding sweet spots, as shown in FIG. 6, also for a monoscopic mode. Observer 1 (e.g. a bank clerk) can see with both eyes information available through sweet-spot $S_1$, while the display appears dark for observer 2 (e.g. a customer).

Figure 7:
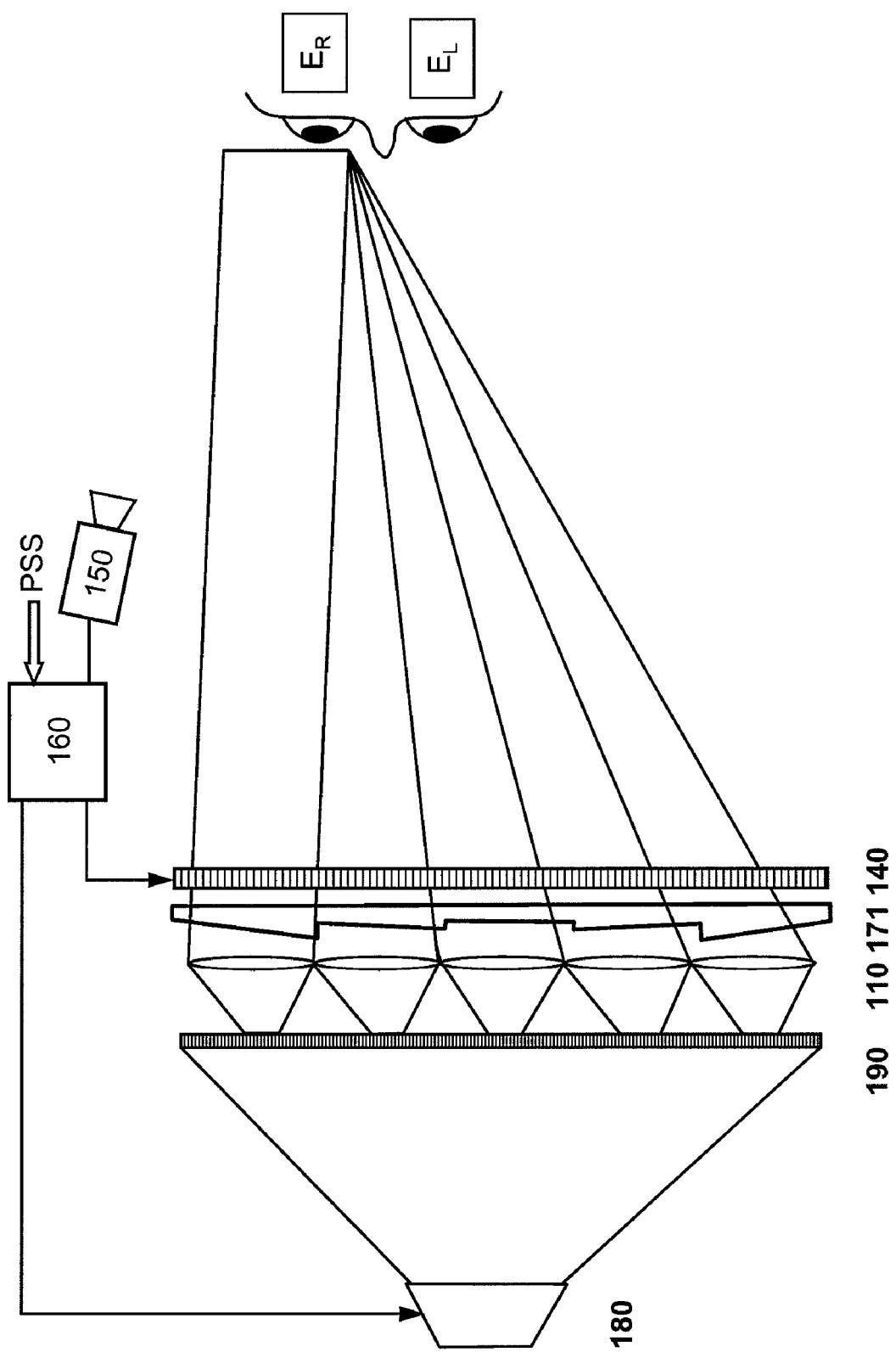
FIG. 7 is a schematic view of an embodiment of the sweet-spot unit, using a projection unit as illumination matrix.

FIG. 7 shows as illumination matrix a projection system 180, which may be based on a DLP, for example. As shown, the imaging means 110 and Fresnel lens 171 generate a sweet-spot for each image of an image sequence provided by the image display matrix 140. The image contents are projected into the viewing space, as described above. According to this invention, it is further possible to dispose a diffuser plate 190 or another field lens in front of the imaging means 110, said plate or lens directing the light onto the imaging means.

Further, the present invention can preferably be applied for sequential representation of images of different image sequences for multiple observers on one display. The display may for example be used in vehicles, in order to alternately present the vehicle driver information provided by an on-board computer, e.g. navigational or operational information such as speed, ambient temperature, fuel consumption, operational faults etc., and a passenger entertaining information, such as a TV programme or video. To achieve this, the tracking and image controller 160 alternates sweet-spots between driver and passenger in synchronism with the image sequence frequency.

Together with the image display matrix, the above-described sweet-spot unit realises an autostereoscopic multi-user display which provides an excellent image quality and thus attracts a wide spectrum of applicants. The display can be used simultaneously for multiple users in both 2D and 3D mode, it is able to perform real-time processing, and it boasts high resolution, great brightness and little depth despite relatively large elements of the illumination matrix. The particularly wide sweet-spots ensure great mobility of the observer (s). The display is robust and greatly reduces the extreme demands on manufacturing precision encountered with prior art devices. Thanks to its great quality features as regards image representation, it is well suited for high-end applications in the fields of medicine, technology, research and development, for video-conference systems and in advertising, and for low-end applications, e.g. home displays, palmtop computers, video-phones and many other applications.

The invention claimed is:

1. Autostereoscopic multi-user display having a sweet-spot unit that is direction-controlled by a tracking and image controller (160), wherein the sweet-spot unit has an illumination matrix (120,130) that includes a multitude of illumination elements these can be activated individually, and an imaging device having lens elements (111 115) for imaging alternately active illumination elements in the form of directed bundles of rays onto extended sweet-spots (SR/SL) which correspond with different eye positions (EL1/ER1, EL2/ER2), so that right and left images of a stereoscopic image sequence provided on a transmissive image display matrix (140) can be rendered visible at right/left eye positions (EL1/ER1, EL2/ER2) of observers, whereby the tracking and image controller (160) defines a direction (D2, D2, . . . or D5) for each bundle of rays (B1 B5) by activating at least one illumination element of the illumination matrix (120, 130) per eye position (EL1/ER1, EL2/ER2), lens element (111 115) and line, so that all bundles of rays (B1 B5) coinside at the position of that sweet-spot(SR/SL), wherein the imaging device comprises:

an imaging means (110) having a multitude of lens elements (111 115) with short focal distance, so that the active illumination elements are imaged onto the sweet-spots (SR/SL) in an enlarged fashion, and a field lens (170) which is disposed behind the imaging means (110) in the direction of light propagation and which has a much longer focal distance than the lens elements (111 115), in order to keep constant and at a minimum the distance between adjacent bundles of rays (B1, B2, B4, B5), so that the definition of directions (D1-D5) of the bundles of rays is supported with the illumination matrix (120).

2. Autostereoscopic multi-user display according to claim 1, wherein the lens elements (111 115) have a short focal distance, and imaging means (110) and illumination matrix (120, 130) are disposed at the about this distance to each other, in order to ensure a great lateral tracking range of the sweet-spot unit.

3. Autostereoscopic multi-user display according to claim 1, wherein the tracking and image controller (160) controls the illumination matrix (120, 130) so that for each eye position a bundle of rays (B3) in the centre of the imaging means (110) leaves the imaging means (110) directed at the eye position (EL/ER), while all other bundles of rays (B1, B2, B4, B5) leave the imaging means (110) near-parallel to the central bundle of rays (B3), and that the field lens (170) coincides all bundles of rays to form a sweet-spot at the corresponding eye position (EL1/ER1, EL2, ER2).

4. Autostereoscopic multi-user display according to claim 1, wherein the field lens (170) is a Fresnel lens.

5. Autostereoscopic multi-user display according to claim 4, characterised in that the cuts of the field lens are designed as regards their focal distance and angle of entry of the bundles of rays so that the bundles of rays are cincided clearly in front of an optimum observer distance, without the bundles of rays themselves converging considerably.

6. Autostereoscopic multi-user display according to claim 1, characterised in that it contains a position detector (150) which determines the lateral eye positions (EL1/ER1, EL2/ER2) of observers and the distances of these eye positions to the image display matrix (140), and that the tracking and image controller (160) adapts the directions (D1-D5) of the bundles of rays (B1 B5) to the detected eye positions (EL1/ER1, EL2/ER2) in the viewing space in front of the display by changing the activated illumination elements accordingly.

7. Autostereoscopic multi-user display according to claim 1, characterised in that the focal distance of the field lens (170 or 171) lies in the range of between a half and a full optimum distance between an observer and the display.

8. Autostereoscopic multi-user display according to claim 7, characterised in that the field lens (170) is a controllable holographic optical element (HOE) with a controllable focal distance, and that the tracking and image controller (160) sets its focal distance according to the detected distances.

9. Autostereoscopic multi-user display according to claim 1, characterised in that the imaging means (110) is a lenticular, tandem-lenticular or double lenticular.

10. Autostereoscopic multi-user display according to claim 1, characterised in that the illumination matrix contains a backlight (130) and an electronic shutter (120) having openings, location and transmission of said openings being discretely controllable.

11. Autostereoscopic multi-user display according to claim 10, characterised in that the image display matrix (140) and shutter (120) have the same pixel geometry.

12. Autostereoscopic multi-user display according to claim 1, characterised in that the illumination matrix is a regular array of actively light-emitting elements, location and intensity of said elements being discretely controllable.

13. Autostereoscopic multi-user display according to claim 1, characterised in that the imaging means (110) is wholly or partly made of a material the optical properties of which are controllable.

14. Autostereoscopic multi-user display according to claim 1, characterised in that the illumination matrix is a projection unit (180) including at least one of a diffusing layer and a Fresnel lens preferably disposed in front of the imaging means (110), seen in the direction of light propagation.

15. Autostereoscopic multi-user display according to claim 1, characterised in that several adjacent illumination elements per projection element and image line are activated simultaneously, so to ensure homogeneous illumination of the image display matrix (140) and to enlarge the sweet-spots.

\* \* \* \* \*